US009448649B2

(12) United States Patent
Aono

(10) Patent No.: US 9,448,649 B2
(45) Date of Patent: Sep. 20, 2016

(54) INPUT APPARATUS

(75) Inventor: Tomotake Aono, Yokohama (JP)

(73) Assignee: KYOCERA CORPORATION, Tokyo (JP)

( * ) Notice: Subject to any disclaimer, the term of this patent is extended or adjusted under 35 U.S.C. 154(b) by 0 days.

(21) Appl. No.: 13/120,814

(22) PCT Filed: Dec. 25, 2009

(86) PCT No.: PCT/JP2009/007316
§ 371 (c)(1),
(2), (4) Date: Mar. 24, 2011

(87) PCT Pub. No.: WO2010/073729
PCT Pub. Date: Jul. 1, 2010

(65) Prior Publication Data
US 2011/0169765 A1 Jul. 14, 2011

(30) Foreign Application Priority Data

Dec. 25, 2008 (JP) ................. 2008-331056

(51) Int. Cl.
G06F 3/041 (2006.01)
G06F 3/01 (2006.01)
G06F 3/0488 (2013.01)

(52) U.S. Cl.
CPC ............. G06F 3/041 (2013.01); G06F 3/016 (2013.01); G06F 3/04886 (2013.01); G06F 3/0414 (2013.01); G06F 3/0488 (2013.01); G06F 2203/014 (2013.01); G06F 2203/04105 (2013.01)

(58) Field of Classification Search
USPC ................................ 345/173–178
See application file for complete search history.

(56) References Cited

U.S. PATENT DOCUMENTS

| 6,295,052 | B1 | 9/2001 | Kato et al. |
| 6,377,685 | B1 | 4/2002 | Krishnan |
| 7,453,439 | B1* | 11/2008 | Kushler ............... G06F 3/0327 345/168 |
| 7,609,178 | B2 | 10/2009 | Son et al. |
| 7,614,008 | B2* | 11/2009 | Ording .......................... 715/773 |
| 7,685,538 | B2 | 3/2010 | Fleck et al. |

(Continued)

FOREIGN PATENT DOCUMENTS

| CN | 1216620 A | 5/1999 |
| EP | 1 967 290 A1 | 9/2008 |

(Continued)

OTHER PUBLICATIONS

International Search Report dated Apr. 13, 2010 in corresponding International Application No. PCT/JP2009/007316 (with translation).

(Continued)

Primary Examiner — Seokyun Moon
(74) Attorney, Agent, or Firm — Oliff PLC

(57) ABSTRACT

An input apparatus has a display unit for displaying an input object, an input unit for receiving a pressure input to the input object, a load detection unit for detecting a pressure load on the input unit, and a control unit for controlling to receive the pressure input if the pressure load detected by the load detection unit satisfies a load standard. The control unit controls such that a load standard for receiving the pressure input to the input object is different from a load standard for receiving a pressure input to another input object adjacent to the input object.

8 Claims, 11 Drawing Sheets

(56) References Cited

U.S. PATENT DOCUMENTS

| | | | |
|---|---|---|---|
| 2002/0110237 | A1 | 8/2002 | Krishnan |
| 2003/0151589 | A1 | 8/2003 | Bensen et al. |
| 2004/0008191 | A1 | 1/2004 | Poupyrev et al. |
| 2004/0021643 | A1 | 2/2004 | Hoshino et al. |
| 2005/0044500 | A1 | 2/2005 | Orimoto et al. |
| 2005/0225540 | A1* | 10/2005 | Kawakami et al. ......... 345/173 |
| 2006/0001654 | A1 | 1/2006 | Smits |
| 2006/0053387 | A1* | 3/2006 | Ording .................... 715/773 |
| 2006/0061597 | A1 | 3/2006 | Hui |
| 2006/0238510 | A1* | 10/2006 | Panotopoulos ....... G06F 3/0238 345/168 |
| 2008/0024459 | A1 | 1/2008 | Poupyrev et al. |
| 2008/0122315 | A1* | 5/2008 | Maruyama et al. ......... 310/314 |
| 2008/0216001 | A1 | 9/2008 | Ording et al. |
| 2008/0252616 | A1 | 10/2008 | Chen |
| 2009/0135147 | A1* | 5/2009 | Hsu et al. ................ 345/173 |
| 2010/0026640 | A1 | 2/2010 | Kim et al. |
| 2010/0026647 | A1 | 2/2010 | Abe et al. |
| 2010/0039393 | A1* | 2/2010 | Pratt et al. ................ 345/173 |
| 2010/0103127 | A1 | 4/2010 | Park et al. |
| 2011/0169765 | A1 | 7/2011 | Aono |
| 2011/0181539 | A1 | 7/2011 | Aono |

FOREIGN PATENT DOCUMENTS

| | | |
|---|---|---|
| EP | 2 000 896 A2 | 12/2008 |
| GB | 2 402 105 A | 12/2004 |
| JP | A-5-143226 | 6/1993 |
| JP | A-6-161660 | 6/1994 |
| JP | A-8-76925 | 3/1996 |
| JP | A-9-62446 | 3/1997 |
| JP | A-10-171600 | 6/1998 |
| JP | A-2001-331245 | 11/2001 |
| JP | A-2005-196810 | 7/2005 |
| JP | A-2005-332063 | 12/2005 |
| JP | A-2006-311224 | 11/2006 |
| JP | B2-4039344 | 1/2008 |
| JP | A-2008-107906 | 5/2008 |
| JP | A-2008-123453 | 5/2008 |
| JP | A-2006-195734 | 7/2008 |
| JP | A-2010-152716 | 7/2010 |
| JP | A-2010-152736 | 7/2010 |
| WO | WO 00/65419 A2 | 11/2000 |

OTHER PUBLICATIONS

International Search Report issued in Application No. PCT/JP2009/007318; Dated Apr. 13, 2010 (with partial translation).
Written Opinion for International Patent Application No. PCT/JP2009/007315, mailed on Mar. 16, 2010 (with partial translation).
International Search Report for International Patent Application No. PCT/JP2009/007315, mailed on Mar. 16, 2010 (with translation).
Aug. 25, 2011 Office Action issued in U.S. Appl. No. 13/121,138.
Oct. 7, 2011 Office Action issued in U.S. Appl. No. 13/120,812.
U.S. Appl. No. 13/120,812.
U.S. Appl. No. 13/121,138.
Nov. 6, 2012 Office Action issued in Korean Patent Application No. 10-2011-7012990 (with English Translation).
Nov. 22, 2013 Office Action issued in European Patent Application No. 09 834 534.1.
Apr. 27, 2012 Office Action issued in U.S. Appl. No. 13/120,812.
Jun. 9, 2013 Office Action issued in Chinese Patent Application No. 200980151363.2 (with translation).
Nov. 23, 2012 Office Action issued in U.S. Appl. No. 13/121,138.
Nov. 12, 2012 Office Action issued in Korean Patent Application No. 10-2011-7012582 (with English Translation).
Mar. 29, 2012 Office Action issued in U.S. Appl. No. 13/121,138.
Aug. 26, 2013 Office Action issued in European Patent Application No. 09834534.1.
European Search Report issued in European Patent Application No. 09834534.1 dated May 8, 2012.
European Search Report issued in European Patent Application No. 09834535.8 dated May 10, 2012.
Apr. 12, 2013 Office Action issued in Chinese Patent Application No. 200980151358.1 (with translation).
Feb. 5, 2013 Office Action issued in European Patent Application No. 09834535.8.
Feb. 5, 2013 Search Report issued in European Patent Application No. 09834534.1.
Mar. 26, 2013 Notification of Reason for Refusal issued in Japanese Patent Application No. 2011-107517 (with translation).
Mar. 26, 2013 Notification of Reason for Refusal issued in Japanese Patent Application No. 2011-107616 (with translation).
Apr. 23, 2014 Office Action issued in U.S. Appl. No. 13/120,812.

* cited by examiner

FIG. 3
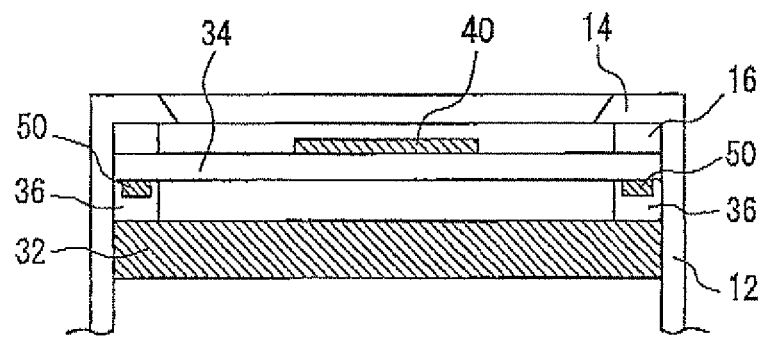
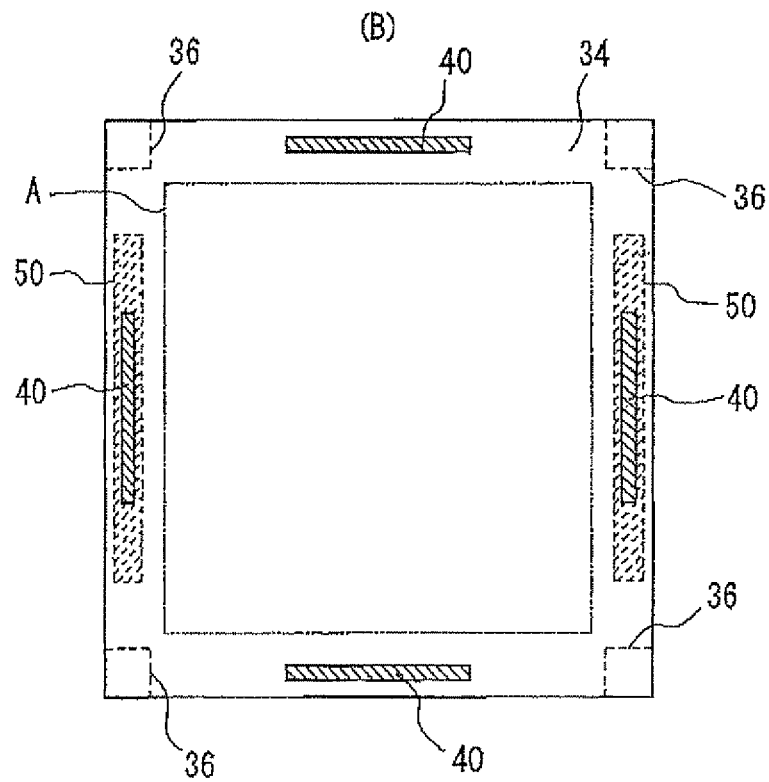

FIG. 7

FIG. 10
(A) (B) (C)
 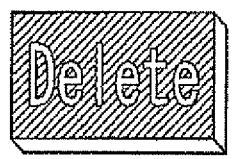 

INPUT APPARATUS

CROSS REFERENCE TO RELATED APPLICATION

This application claims priority to and the benefit of Japanese Patent Application No. 2008-331056 filed on Dec. 25, 2008, the entire contents of which are incorporated herein by reference.

TECHNICAL FIELD

The present invention relates to input apparatuses, and more particularly, to input apparatuses having touch panels.

BACKGROUND ART

For mobile terminals such as mobile phones, various input apparatuses used by users to operate the terminals have been developed according to functions and usages of each of the terminals. In many cases, an input apparatus has mechanical keys or buttons arranged in advance on a surface of a body such that a user performs an input operation by directly pressing a finger or the like to the keys.

The mechanical keys (for example, a numerical keypad) of the input apparatus of the terminal are normally arranged in advance to suit a main usage of the terminal. Accordingly, it is generally not possible to change a physical arrangement of keys, once defined, later.

Recently, a variety of functions are incorporated in small mobile terminals. For example, the mobile phones have a digital camera function and a music player function. There are mobile terminals such as a mobile phone having numerous supplementary functions incorporated therein in addition to a function for a main usage of the terminal, and PDA (Personal Digital Assistant: mobile information terminal) having, as a single terminal, a plurality of main usages such as schedule management, an address book and the like. If such terminals have keys fixedly arranged, it may inconvenience the user significantly in using particular functions.

In order to resolve such inconvenience, there is disclosed an input apparatus having a touch panel designed such that a transparent input unit is arranged overlapping a front face of a liquid crystal display constituting a display unit (for example, see Patent Document 1). The input apparatus having such a touch panel generally displays graphical images of operation keys and buttons (hereinafter, referred to as "input objects") on a display screen of the touch panel. When the user presses an input object displayed on the display screen, an input unit at a corresponding position on the touch panel receives an input.

A folding mobile phone described in the above Patent Document 1 can display input objects arbitrarily arranged on the display screen of the touch panel to receive input operations by the user, and thus key arrangements can be designed as desired. Accordingly, this mobile phone may provide an excellent operability, as capable of changing the arrangement of the input objects as desired to suit a function when each function of the terminal is switched. For example, when the user uses a digital camera function implemented in the mobile phone, this mobile phone may display input objects constituting an operation unit for a digital camera on the touch panel and receive operation inputs. On the other hand, when the user inputs characters in messages using the mobile phone, the mobile phone may display an input object constituting a keyboard like a personal computer (PC) on the touch panel and receive inputs.

As stated above, this mobile phone having the touch panel can optimize a single input apparatus to suit each of a plurality of functions and receive operation inputs.

In addition, since the input apparatus having the touch panel receives an input in the form of a user's direct contact (touch) of a finger or the like to the input object displayed on the display unit, the user can operate it highly intuitively. That is, the user operates the input apparatus by directly touching the input object displayed on the screen with a finger or the like following a guide displayed on the screen of the touch panel. Accordingly, the user can operate the terminal extremely easily through intuitive operations following the guide displayed on the screen, which offers an effect to reduce incorrect operations as a result.

In recent years, the mobile terminal having the touch panel as stated above enables the user not only to make a normal telephone call and to perform operation inputs for creating a message but also to perform operation inputs to view (browse) contents delivered through the internet and websites. In addition, the input apparatuses having the touch panel are commonly used for not only the mobile terminals but also, for example, ATMs (Automatic Teller Machines) of a bank and the like and ticket vending machines at train stations. Moreover, in stores such as fast-food shops, terminal equipment with the input apparatus having the touch panel as above is used by a clerk to process orders from customers. When the touch panel is employed as the input apparatus, the mechanical buttons and keys such as the keyboard are not essential components any more. Accordingly, since only a small area is required to arrange mechanical buttons and the like on the terminal apparatus, it enables downsizing of overall terminal apparatus. Therefore, it offers a broader choice of installation sites of the terminal apparatus in stores and train stations.

In addition, the touch panel employed as the input apparatus eliminates the necessity of separately having a display unit for displaying various information and an input unit for receiving operation inputs by the user as individual function units like a general design of conventional apparatus, and enables to configure the information display unit and the input unit on the same screen. Accordingly, it is possible, for example, to display input object constituting keys of a keyboard on the touch panel to receive an input by the user while displaying a result of the input near the keyboard on the touch panel. Thereby, the user can perform an operation input and confirm the result of the input on the same screen.

As described above, the touch panel provides merits to enable to configure the input unit and the display unit on the same screen and also to enable intuitive operation inputs. For that reason, the number of terminal apparatuses having such input apparatus has been increased more and more.

However, the input apparatus with the touch panel has a specific problem because of its configuration to have the input unit and the display unit on the same screen and to receive the intuitive operation input. That is, although the touch panel can constitute the display unit arranging the input objects as desired, it is difficult for the user to determine a boundary between an input object and another area by a tactile sensation because a surface of the input unit is generally flat. In addition, since the user directly touches the input unit with a finger or a stylus in order to input to the touch panel, the input object is covered at the moment of the pressure input, preventing the user from visually confirming the input object to receive the operation input.

Accordingly, since the user cannot determine, with a feeling on the finger, whether the finger is touching an input object, there is always a possibility to press an unintended position. That is, there is a risk of pressing a position elsewhere than an intended input object by pressing a position slightly off from it or a risk of pressing another input object adjacent to the intended input object. When pressing an input object intended with a finger, a risk of unintended input becomes higher, as the input object is covered with the finger.

In addition, if the unintended input of the user is received by the input apparatus, an operation that the user does not intend may be started in response to the input. In such a case, the user must perform an additional operation to stop (cancel) the unintended operation. Moreover, if an important processing or operation being performed is stopped because of the unintended operation, it may cause an unrecoverable situation. Accordingly, it is desired to reduce a risk that such an unintended operation is started based on the unintended input by the user, as much as possible.

As a scheme capable of handling such a condition, there is suggested an input apparatus having a means to detect an input pressure to the touch panel and is configured to change a height of a surface of the touch panel in accordance with a position and the pressure of the input to the touch panel by the user (for example, see Patent Document 2).

PRIOR ART DOCUMENTS

Patent Documents

Patent Document 1: Japanese Patent Laid-Open No. 2006-311224
Patent Document 2: Japanese Patent No. 4039344

SUMMARY OF INVENTION

Technical Problem

According to the input apparatus described in the above Patent Document 2, when there is a user's input to an input object displayed on the display unit of the touch panel, it is possible to indicate that the user is touching the input object, by changing the height of the touch panel. That is, when the user touches an input object, this input apparatus indicates that the position touched by the user corresponds to an input object, by lifting the surface of the touch panel higher than a level when the user touches an area elsewhere than an input object. In addition, when recognizing a light touch by the user to a position corresponding to an input object of the touch panel, this input apparatus enlarges an image of the input object to allow for better viewability (for example, see FIG. 7 and FIG. 10 of Patent Document 2). With a variety of measures taken as stated above, the input apparatus described in Patent Document 2 helps the user to input avoiding erroneous operations.

According to this input apparatus, the user can determine, with the feeling on the finger, whether there is an input object at a position of the touch panel that the finger is touching. In addition, as capable of enlarging the image of the input object being touched by the user, this input apparatus can relatively reduce an area covered with the finger touching the input object. Accordingly, this input apparatus can reduce the risk of receiving unintended inputs by the user.

However, there are disadvantages when such a technique is applied to a small mobile terminal such as the mobile phone, for example. That is, a mechanism to change the height of the surface of the touch panel as stated above requires a considerable width wider than the variation width of the surface of the touch panel. This is because that a mechanical drive apparatus to change the height of the touch panel needs to be in a certain size at least and that it is necessary to secure a space to allow for a change in the height of overall touch panel. In recent development of the mobile phone, it is desired to minimize its size as much as possible and thus it is anticipated to present a technical difficulty in mounting such a mechanism for changing the height of the surface of the touch panel in a body of the mobile phone.

In addition, in case of a small mobile terminal such as a mobile phone, unlike large terminals such as the ATMs of a bank and the ticket vending machines at a train station, the touch panel serving also as a display unit is substantially limited in size, and thus the display unit for displaying input objects is small in size inevitably. On the other hand, although being small in size, the mobile terminal needs to display a number of input objects of various types, in order to receive various inputs to the touch panel by the user. Accordingly, it is considered that there is difficulty for the mobile terminal to display an enlarged image of an input object when a user touches the input object.

Moreover, when a number of input objects are displayed on the touch panel limited in size, it is considered that it is difficult to virtually indicate whether the location the user is touching corresponds to an input object, by changing the height of the touch panel as stated above. Especially, if a number of input objects limited in size are arranged at adjacent positions, there is little or no space between them. Therefore, it is considered that it is very difficult to enable the user to recognize an edge portion (a portion corresponding to an edge of a key) of each of the input objects by changing the height of the touch panel. Accordingly, it is considered that, when a number of small input objects are displayed at adjacent positions on the touch panel of the small mobile terminal such as the mobile phone, it is difficult to reduce user's incorrect inputs by applying the above scheme described in the Patent Document 2.

In addition, the small mobile terminal such as the mobile phone has a particular condition not only to display a number of input objects on the touch panel limited in size but also to receive user's inputs while the user is walking or performing another operation. It is desired to provide an input apparatus which, even if the user is not gazing at the input unit, receives inputs to a number of input objects as intended by the user and also helps to avoid incorrect operations by the user.

Accordingly, an object of the present invention in consideration of such conditions is to provide an input apparatus capable of reducing incorrect operations by a user in receiving pressure inputs to a plurality of adjacent input objects on a touch panel mounted on, for example, a mobile phone.

Solution to Problem

In order to achieve the above object, an input apparatus according to a first aspect of the present invention includes:
a display unit for displaying an input object;
an input unit for receiving a pressure input to the input object displayed on the display unit;
a load detection unit for detecting a pressure load on the input unit; and
a control unit for controlling to receive the pressure input if the pressure load detected by the load detection unit satisfies a load standard, wherein
the control unit controls such that a load standard for receiving a pressure input to the input object is different from a load standard for receiving a pressure input to another input object adjacent to the input object.

A second aspect of the present invention is that the input apparatus according to the first aspect further including a vibration unit for vibrating the input unit, wherein the control unit controls to drive the vibration unit if the pressure load detected by the load detection unit satisfies the load standard.

A third aspect of the present invention is that, in the input apparatus according to the second aspect, the control unit controls to drive again the vibration unit if the pressure load detected by the load detection unit does not satisfy the load standard after the pressure load detected by the load detection unit satisfies the load standard.

A fourth aspect of the present invention is that, in the input apparatus according to any one of the first to the third aspects, the control unit controls to confirm the pressure input to the input object being received by the input unit when the pressure load detected by the load detection unit does not satisfy the load standard after the pressure load detected by the load detection unit satisfies the load standard.

BRIEF DESCRIPTION OF DRAWINGS

FIG. 3 shows diagrams illustrating an exemplary implementation structure of a touch panel, a load detection unit and a vibration unit of the mobile phone shown in FIG. 2;

FIG. 7 shows exemplary displays on the display unit based on the input object load standard setting processing according to the present embodiment;

FIG. 10 is a diagram illustrating a highlight display and a press-down display according to the present embodiment.

DESCRIPTION OF EMBODIMENTS

Embodiments of the present invention will be described with reference to the accompanying drawings. In the following embodiments, a mobile phone is used as an exemplary mobile terminal with an input apparatus according to the present invention. However, the mobile terminal to which the input apparatus according to the present invention is applicable is not only the mobile phone but also any mobile terminal having a touch panel such as a PDA, for example. In addition, the present invention is applicable not only to the mobile terminal having the touch panel but also to any input terminal having the touch panel such as ATMs of a bank and ticket vending machines at a train station as stated above.

Figure 1:
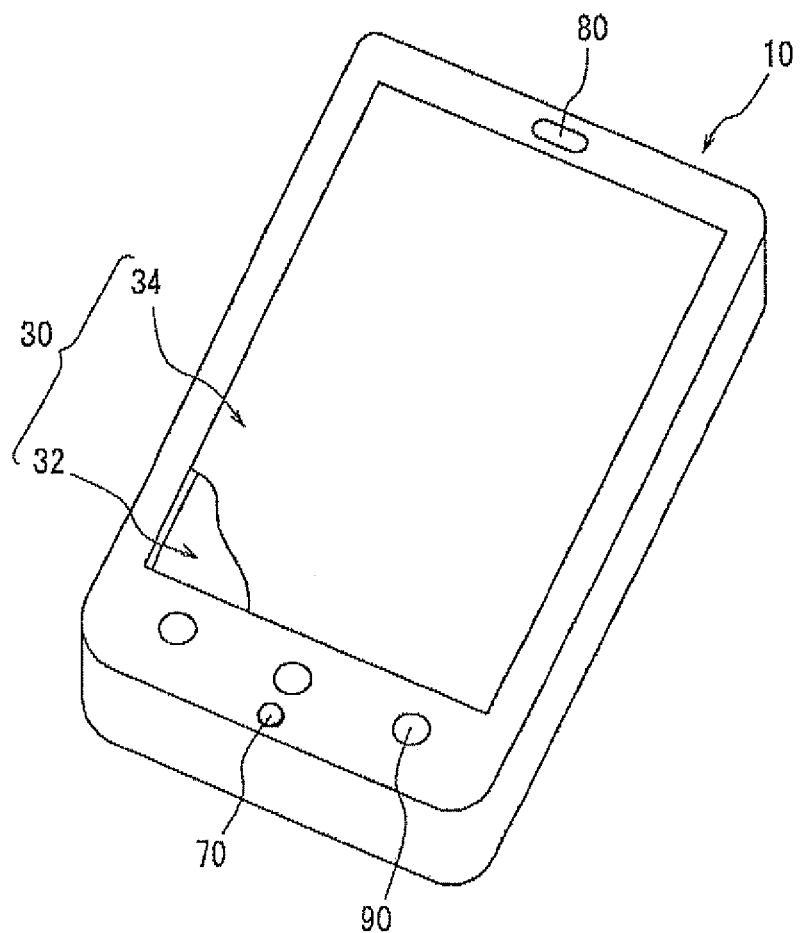
FIG. 1 is an external perspective view of a mobile phone having an input apparatus according to an embodiment of the present invention.

FIG. 1 is an external perspective view illustrating a schematic configuration of a mobile phone 10 having an input apparatus according to an embodiment of the present invention. The mobile phone 10 has a display unit 32, a part of which is displayed in the figure, on a front face of a terminal body, for displaying a variety of information and graphical images of keys and buttons on a liquid crystal display (LCD), an organic EL display or the like. The mobile phone 10 also has an input unit 34 constituted of a matrix switch or the like for receiving an input by a user with a finger or a stylus at a front face of the display unit 32. According to the present embodiment, a touch panel 30 includes the display unit 32 and the input unit 34. The mobile phone 10 further includes an audio input unit 70 constituted of a microphone or the like, an audio output unit 80 constituted of a speaker or the like, and a key input unit 90 constituted of at least one mechanical key.

Although the mobile phone 10 may additionally have a digital camera function unit, a One-seg broadcast tuner, a Near Field Communication unit such as an infrared communication function unit, various interfaces and the like according to necessary functions, figures and detailed descriptions thereof are omitted.

Figure 2:
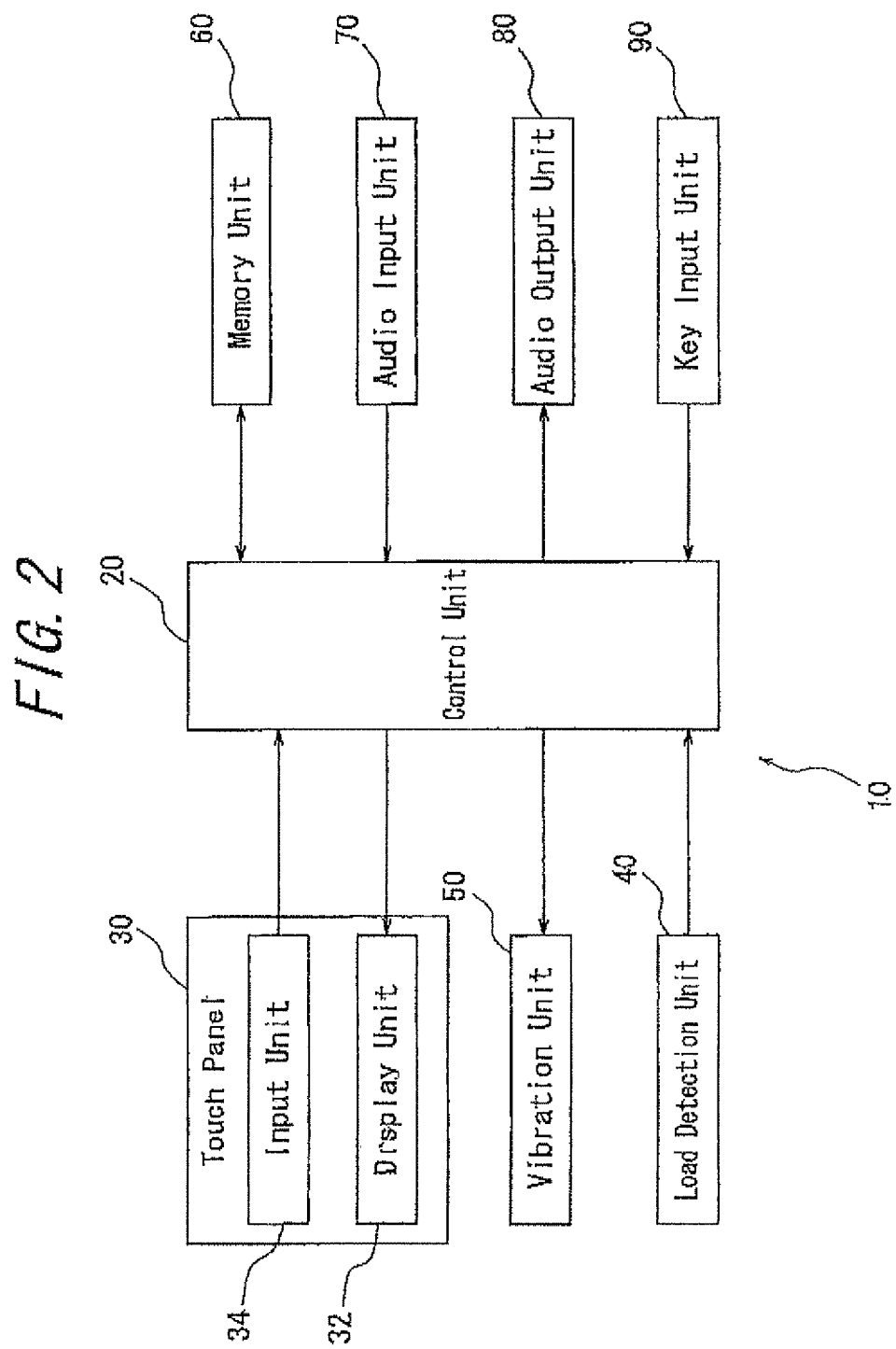
FIG. 2 is a functional block diagram illustrating an internal configuration of the mobile phone according to the embodiment of the present invention.

FIG. 2 is a functional block diagram illustrating a schematic internal configuration of the mobile phone 10. As shown in FIG. 2, the mobile phone 10 has a control unit 20, a touch panel 30, a load detection unit 40, a vibration unit 50, a memory unit 60, the audio input unit 70, the audio output unit 80 and the key input unit 90. The control unit 20 controls and manages the entire mobile terminal 10 as well as each functional block of the mobile terminal 10. As stated above, the touch panel 30 has a structure that the input unit 34 for receiving input from a user is arranged overlapping the front face of the display unit 32. Thereby, the touch panel 30 receives an operation input by the user as well as displaying a variety of information such as a result of the input according to each application program (hereinafter, abbreviated to an "application").

The input unit 34 of the touch panel 30, upon detection of an input by a contact (pressure) of a user's finger or a stylus, outputs a signal corresponding to a position where such input is detected. The touch panel 30 is made as a known type such as, for example, resistance film type, capacitance type or the like. The display unit 32 performs display according to each application, as well as displaying a graphical image of user interface, composed of various keys and buttons for receiving operation inputs to the input unit 34 by the user in a predetermined display area. According to the present embodiment, the images of the various keys and buttons displayed on the display unit 32 for receiving operation inputs to the input unit 34 of the touch panel 30 by the user are referred to as "input objects".

The load detection unit 40 may be a strain gauge sensor, for example, and detects a pressure load on the touch panel 30 (or the input unit 34). The vibration unit 50 may be, for example, a piezoelectric element or an ultrasonic transducer and vibrates the touch panel 30. A constitutional relationship among the load detection unit 40, the vibration unit 50 and the touch panel 30 will be described below.

The memory unit 60 stores various applications and a variety of input information, as well as functioning as a work memory. In addition, the memory unit 60 also stores a plurality of templates including various input objects to be used according to each application.

The audio input unit 70 converts user's voice and the like into input signals and transmits them to the control unit 20. The audio output unit 80 converts voice signals transmitted from the control unit 20 into voice. The key input unit 90 transmits a signal corresponding to an operation input by the user to the control unit 20. Usages and functions of the various keys constituting the key input unit 90 are defined according to an application to be used.

The mobile phone 10 further includes various function units necessary for providing functions as a usual mobile phone such as an antenna and a wireless communication unit for transmitting and receiving a variety of information such as voice call and e-mail data to/from a base station via the interne, wireless communication and the like. However, since such function units have no particular distinction from known arts, descriptions thereof are omitted.

Next, the constitutional relationship among the load detection unit 40, the vibration unit 50 and the touch panel 30 is described.

FIG. 3 is a diagram illustrating an exemplary implementation structure of the touch panel 30, the load detection unit 40 and the vibration unit 50 of the mobile phone 10 shown in FIG. 2. FIG. 3(A) is a cross-sectional view of a main section, whereas FIG. 3(B) is a plane view of the main section.

The display unit 32 for displaying various input objects on the touch panel 30 is housed in a housing 12. In the input apparatus according to the present embodiment, the input unit 34 is supported on the display unit 32 via insulators 36 made of elastic members. In the input apparatus according to the present embodiment, the display unit 32 and the input unit 34 are rectangular in a planar view. Although the touch panel 30 is square in FIG. 3, it may be oblong in accordance with specifications of the mobile terminal mounting the touch panel 30. In the input apparatus, the input unit 34 is supported on the display unit 32 via the insulators 36 arranged at four corners outside a display area A of the display unit 32 indicated by virtual lines in FIG. 3(B).

In addition, in the input apparatus, the housing 12 is provided with an upper cover 14 for covering a surface area of the input unit 34 outside the display area of the display unit 32. Insulators 16 made of elastic members are arranged between the upper cover 14 and the input unit 34.

The input unit 34 has a surface, that is, a face for receiving input operations, formed of a transparent film, and a rear face formed of a glass. The input unit 34 may be designed such that the transparent film of the surface slightly bends (strains) in proportion to pressure when an operation face is pressed.

In addition, in the input apparatus according to the present embodiment, the strain gauge sensor for detecting the pressure load (pressure) applied on the input unit 34 is provided, adhered or the like, to the transparent film on the surface of the input unit 34 near each side covered by the upper cover 14. Moreover, in the input apparatus, the piezoelectric element or the ultrasound transducer for vibrating the input unit 34 is provided, adhered or the like, to the face of the glass on the rear side of the input unit 34 near each of two opposed sides. That is, in the input apparatus shown in FIG. 3, the load detection unit 40 and the vibration unit 50 shown in FIG. 2 include four strain gauge sensors and two vibrators, respectively. It is to be noted that the housing 12, the upper cover 14 and the insulator 16 shown in FIG. 3(A) are omitted in FIG. 3(B).

In the input apparatus according to the present embodiment, the control unit 20 monitors an input detected by the input unit 34 and a pressure load detected by the load detection unit 40. If the pressure input detected by the input unit 34 is an input to an input object displayed on the display unit 32 and the pressure load detected by the load detection unit 40 satisfies a predetermined standard for receiving an input, the control unit 20 receives such an input as a normal input. Hereinafter, this "standard for receiving an input" is referred to as a "load standard", simply. In addition, when the input satisfies the load standard, the control unit 20 controls the vibration unit 50 to generate vibration such that the vibration is given to an object pressing the input unit 34 such as the user's finger or the stylus. The load detection unit 40 detects the load from, for example, an average output value of the four strain gauge sensors. Additionally, the vibration unit 50 drives, for example, two ultrasound transducers in phase. Since the vibration unit 50 generates vibration when the load standard is satisfied, the user can recognize that the pressure input by the user is received appropriately.

Figure 4:
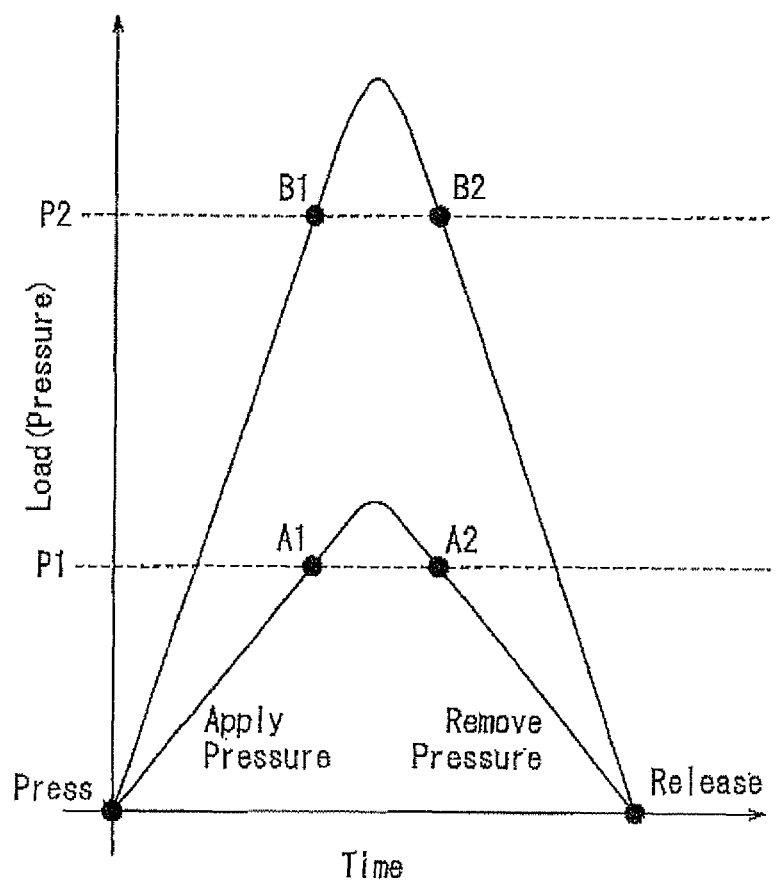
FIG. 4 is a graph schematically illustrating an exemplary chronological change in a load (pressure) detected by the load detection unit when a user presses an input unit of the touch panel.

Next, the load standard of an input object according to the present embodiment is described. FIG. 4 is a graph schematically illustrating an exemplary chronological change in a pressure load (pressure) detected by the load detection unit 40 when the user performs an operation input by pressing the input unit 34 of the touch panel 30. Generally, when performing operation to press (pressure input) the input unit 34 of the touch panel 30, the user continues to increase pressure on the input unit 34 (that is, the user presses the input unit 34 down) from when touching the input unit 34 until determining that the input is received. In addition, upon determining that the input is received, the user reduces the pressure on the input unit 34 (that is, the user releases a finger or the like from the input unit 34). Accordingly, as represented by a curved line shown in FIG. 4, the load detected by the load detection unit 40 is first increased upward and then reduced downward with time passing from the left side to the right side.

The following is a description of an initial setting preparing for input object load standard setting processing. In order to perform the input object load standard setting processing according to the present embodiment, a load standard P1 is set for determining that there is an input to the input unit 34 as a normal operation input to an input object displayed on the display unit 32. The load standard P1 is set by the control unit 20 based on a normal pressure at the normal operation input to the display unit 32 by the user. Based on this setting, if a pressure load exceeding the P1 (A1), as the normal pressure at the normal operation input by the user, is detected by the load detection unit 40, the control unit 20 determines that the input object displayed on the display unit 32 is pressed. In addition, if the load detection unit 40 detects that the load pressure on the input object being pressed drops under the P1 (A2) (after A1), the control unit 20 determines that the operation input to the input object being pressed is completed (confirmed).

The load standard P1 set as stated above prevents the input apparatus from determining a slight touch to the input unit 34 by the user as an input. Thereby, it is possible to avoid an unintended input by the user.

In addition, the load standard P1 set as stated above enables the user to perform a repetitive tapping by pressing the same spot (the same input object) on the input unit 34 multiple times continually, without releasing the finger from the input unit 34 each time. That is, even if the user's finger keeps touching the input unit 34, the user can make the input unit 34 recognize such an input as the repetitive tapping, by adjusting strength of pressure by the finger to increase and decrease across the load standard P1. Since this input method needs only small strokes of the user's finger, the user mastering this method may quickly and easily input with a smaller movement of the finger.

Next, according to the present embodiment, the control unit 20 sets a load standard P2 based on a pressure larger (heavier) than the normal pressure at the normal operation input to the input unit 34 by the user. According to the present embodiment, a pressure exceeding the load standard P2 set in this manner is received as an input to another input object adjacent to the input object with the load standard P1 described above. Accordingly, if a pressure load exceeding the load standard P2 (B2) greater than the P1 on another input object adjacent to the input object with the load standard P1 is detected by the load detection unit 40, the control unit 20 determines that this adjacent input object is pressed. In addition, if the load detection unit 40 detects that the load pressure on the adjacent input object being pressed drops under the P2 (132) (after B1), the control unit 20 determines that the operation input to the input object being pressed is completed (confirmed). That is, the control unit 20 controls such that the load standard for receiving a pressure input to another input object adjacent to the input object displayed on the display unit 32 is higher than the load standard P1 for receiving a pressure input to the input object.

Accordingly, even if the user presses another input object adjacent to the input object with the load standard P1 at a normal pressure (under P2) of the normal operation input, the control unit 20 does not receive this pressure input as an input to this adjacent input object. However, only if the user presses the adjacent input object at a pressure exceeding the P2 greater than the normal pressure (P1) at the normal operation input, the control unit 20 receives this pressure input as an input to this input object.

In the above description, the load standards (P1, P2) are defined as "pressure load thresholds" and used to determined that "the load standard is satisfied" if it is exceeded, for example. Although a determination in this manner is applied to the following descriptions, there may also be other conditions to determine that "the load standard is satisfied". For example, it is possible to determine that the load standard is satisfied if the pressure load of the pressure input to an input object by the user "reaches" the above load standard. In addition, it is also possible to determine that the load standard is satisfied if the pressure load indicating the above load standard is "detected" by the load detection unit 40.

Next, operations by the vibration unit 50 according to the present embodiment is described. The vibration unit 50 is controlled by the control unit 20 to vibrate the input unit 34. Since vibration of the input unit 34 is transmitted to the user's finger or the stylus performing an operation input, the user can recognize, by feeling the vibration, that an input to the input unit 34 is appropriately received. In generating vibration, the control unit 20 controls to drive the vibration unit 50 when the pressure load detected by the load detection unit 40 satisfies the load standard.

According to the present embodiment, different vibrations are generated when each of the load standard P1 and the load standard P2 is satisfied. That is, for the input object with the load standard P1, the control unit 20 generates vibration corresponding to the load standard P1. Thereby, the user can recognize that an input with the load standard P1 to the input object is received appropriately. In addition, for the input object with the load standard P2, the control unit 20 generates vibration corresponding to the load standard P2, which is different from the vibration for the P1. Thereby, the user can recognize that an input with the load standard P2 to the input object is received appropriately.

For example, upon detection of a pressure load exceeding the P1 (A1) shown in FIG. 4 to the input object with the load standard P1 by the load detection unit 40, the control unit 20 controls the vibration unit 50 to generate vibration in a waveform shown in FIG. 5(A). Then, upon detection of a pressure load equal to or lower than the P1 (A2) shown in FIG. 4 to this input object by the load detection unit 40, the control unit 20 controls the vibration unit 50 to generate vibration in a waveform shown in FIG. 5(B). Moreover, upon detection of a pressure load exceeding the P2 (B1) shown in FIG. 4 to the input object with the load standard P2 by the load detection unit 40, the control unit 20 controls the vibration unit 50 to generate vibration in a waveform shown in FIG. 5(C). Then, upon detection of a pressure load equal to or lower than the P2 (B2) shown in FIG. 4 to this input object by the load detection unit 40, the control unit 20 controls the vibration unit 50 to generate vibration in a waveform shown in FIG. 5(D).

Figure 5:
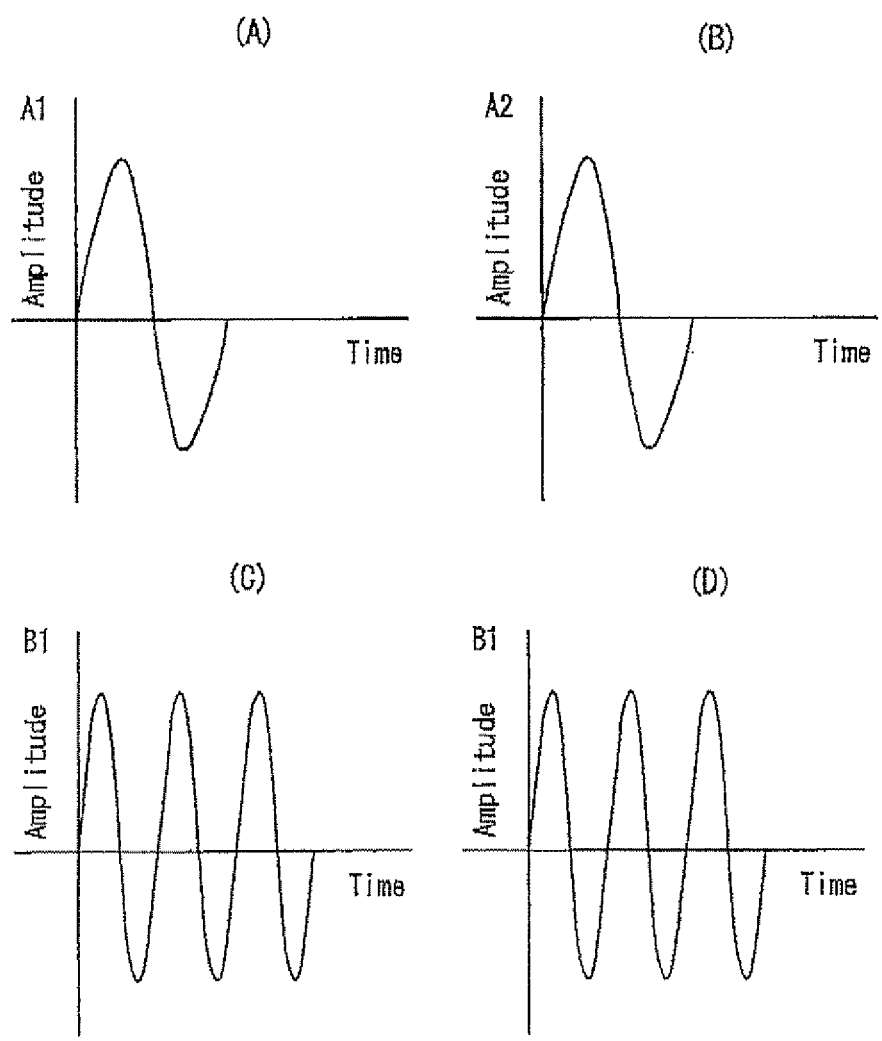
FIG. 5 shows exemplary waveforms of vibrations generated by the vibration unit of the mobile phone according to the present embodiment.

As shown by exemplary vibrations in FIG. 5, a short vibration (with a low frequency) is generated for an input object with a low load standard (P1), whereas a long vibration (with a high frequency) is generated for an input object with a high load standard (P2). Thereby, the user can confirm an input with a weak (low) pressure load and an input with a strong (high) pressure load by feeling weak (short) vibration and strong (long) vibration, respectively.

Next, the input object load standard setting processing according to the present embodiment is described with reference to a flowchart shown in FIG. 6. The input object load standard setting processing according to the present embodiment starts upon reception, by the control unit 20, of a request (command) to activate an application to display a user interface composed of input objects on the display unit 32 of the touch panel 30. First, upon reception of the command to activate the application to display the user interface, the control unit 20 reads a template corresponding to the request among templates of various user interfaces stored in the memory unit 60 (step S1).

After reading the template of the user interface, the control unit 20 determines whether there is a plurality of input objects included in the template (step S2). If there is a plurality of input objects included in the template, the control unit 20 next determines whether the specification needs to arrange adjacent input objects at intervals shorter than a predetermined interval (step S3). The predetermined interval will be described below. If there is a plurality of input objects included in the template and the adjacent input objects arranged at intervals shorter than the predetermined interval, the control unit 20 sets a load standard of each of the input objects (step S4) such that load standards (P1 and P2) for receiving pressure inputs to these input objects are different from each other.

Upon completion of setting the load standard of each of the input objects at step S4, the control unit 20 displays these input objects on the display unit 32 to receive an input by the user (step S5). If the number of input objects is not more than 1 at step S2, that is, there is only one input object, the normal load standard (P1) is set for this input object (step S6), and then the processing shifts to step S5. Also, if a plurality of input objects is arranged at intervals wider than the predetermined interval at step S3, the normal load standard (P1) is set for all of these input objects (step S6), and then the processing shifts to step S5.

Thereby, if a plurality of input objects is arranged at adjacent positions, different load standards for receiving pressure inputs are set to the input objects, respectively. The predetermined interval stated above is an interval at which, if the input objects are arranged at intervals narrower than that, it is highly possible for the user to press an input object other than an intended input object by mistake. Here, the predetermined interval may be a distance from an end of one input object to an end of another input object or a distance from a center of one input object to a center of another input object. The following is a detailed description of a result of the above processing with reference to a typical embodiment.

Figure 7:
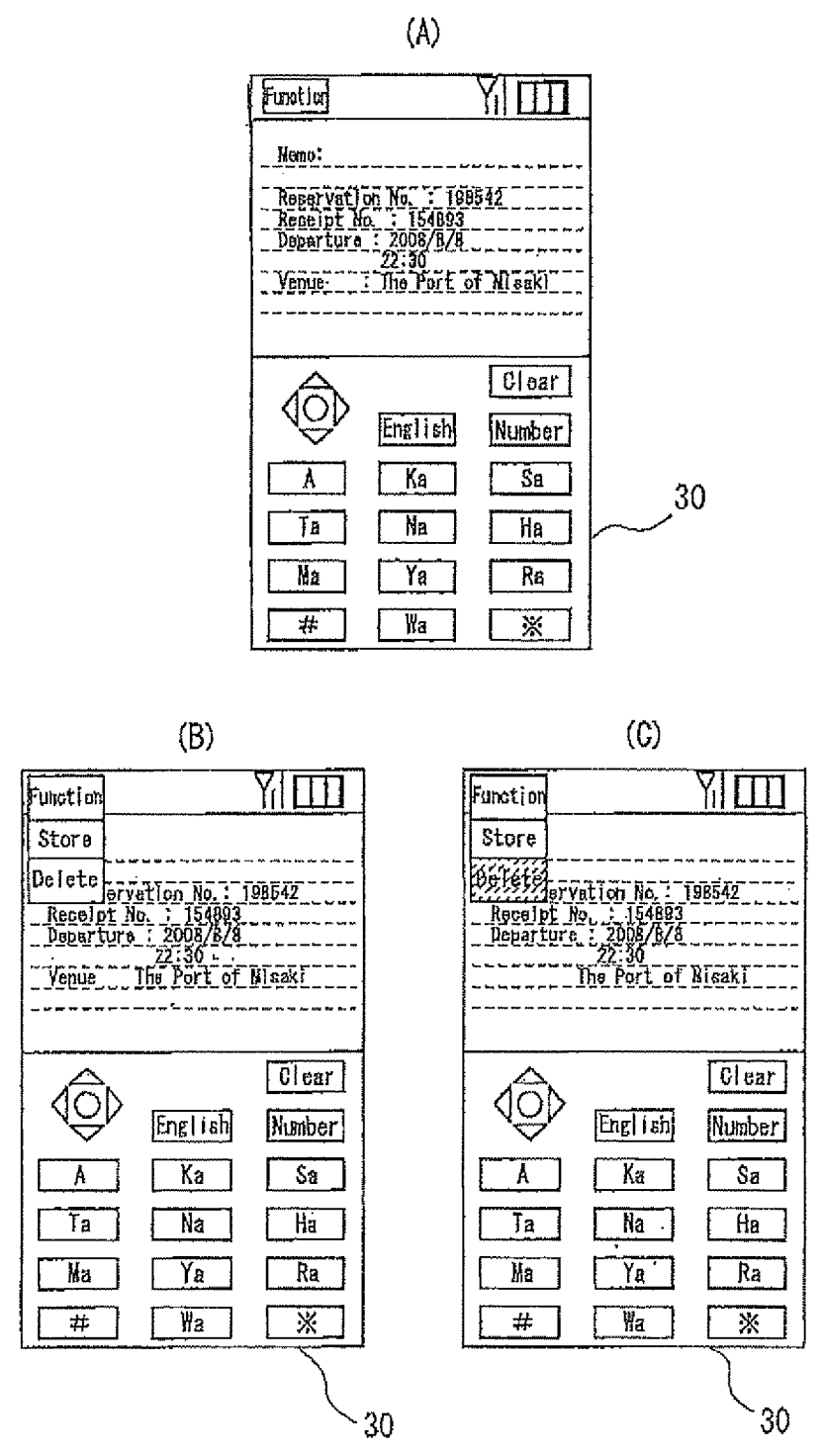

The following is a description of a case in which a user memo writing application is activated as shown in FIG. 7(A), for example. This application displays character input objects in an approximately lower half portion of the display unit 32 of the touch panel 30 in order to receive user's inputs to the input unit 34. This user memo writing application displays the character input objects arranged at the predetermined intervals or wider. In this example, accordingly, there is a less probability for the user to press an input object other than an intended input object by mistake, the control unit 20 sets the normal load standard (P1) for each of these input objects. It is to be noted that, since it is a conventional art known as a "multi-tap input method" to input each character using a numerical keypad associated with kana characters by transiting kana characters corresponding to each key according to the number of input times of the key in order of "Hiragana", a description thereof is omitted.

When the user stores a memo in the memory unit (memory) 60 after completing inputs of the characters as shown in FIG. 7(A), the control unit 20, in response to a pressure input to the input object "Function" displayed in the upper left portion of the display unit 32 of the touch panel 20, displays a so-called pull-down menu as shown in FIG. 7(B). The pull-down menu of a "Function" includes input objects "Store" and "Delete". If these two input objects are arranged at an interval narrower than the predetermined interval (for example, adjacent to each other), different load standards for receiving pressure inputs are set for the input objects "Store" and "Delete" by the load standard setting processing stated above. If one of the adjacent input objects is related to an unrecoverable (important) operation such as the input object "Delete" in this case, the load standard P2, 3 N (Newton), for example, is set for this input object. Additionally, the load standard P1, 1 N, for example, is set for the input object such as the input object "Store" adjacent to the input object with the load standard P2.

As stated above, it is possible, by setting different load standards for the input objects, to prevent a disadvantage caused if the user presses the input object "Delete" by mistake in spite of an intention to press the input object "Store". That is, even if there is an input with a normal pressure (under P2) at a normal operation input to the input object "Delete", the input apparatus according to the present embodiment does not receive this as an input. In order to input to the input object "Delete", it is necessary for the user to purposely perform an operation input with a pressure load exceeding the load standard (P2) greater than the normal pressure (P1) at the normal operation input.

In addition, even if the touch panel 30 has a function to simultaneously receive inputs to a plurality of input objects, the same processing as stated above may be performed. That is, for example, it may happen that the user, intending to press the input object "Store", presses both of the input objects "Store" and "Delete" simultaneously by mistake (or because a contact area of the finger pressing the input unit 34 protrudes from the input object "Store"). In this case also, the input to the input object "Delete" at a normal (under P2) pressure of a normal operation input is not received. A method to handle a case, opposite to the case stated above, that the user presses the input object "Store" by mistake in spite of an intention to press the input object "Delete" will be described below.

According to the present embodiment as stated above, a load greater (exceeding the P2) than the pressure load based on the normal operation input is set for an input object adjacent to the input object for receiving an input by a normal pressure based on the normal operation input (exceeding the P1). An input by a pressure load greater (heavier) than that of the normal operation input differs from various inputs (for example, holding down and double pressing such as double click) regarded as normal input methods. Accordingly, since the various inputs, regarded as the normal input methods, to the input object with the load standard P2 is not received, an incorrect input unintended by the user is not received as a valid input. That is, an input by an unintended operation by the user is avoided.

If input objects are arranged at adjacent positions in the processing according to the present embodiment, it is preferred to indicate, for the user, that the input object with the load standard P2 needs to be pressed at a pressure heavier than that of the normal operation input. As the input object of "Delete" key shown in FIG. 7(C), for example, the input object to which a user needs to input with a strong pressure, is displayed in a different color from other input objects on the display unit 32. Thereby, it is possible to emphasize that the input object in the different color is the input object with the load standard P2. In addition, it is also possible to display such an input object, together with a note such as "Touch 'Delete' key strongly", for example, at a predetermined position on the display unit 32.

Figure 8:
FIG. 8 shows another exemplary display on the display unit based on the input object load standard setting processing according to the present embodiment.

Now, another embodiment is described. On a display panel of the user memo writing application shown in FIG. 8, although an arrangement of the character input objects displayed on the display unit 32 of the touch panel 30 is similar to that shown in FIG. 7, it is provided with a larger area to display a result (memo) of user's inputs. Accordingly, an area to arrange the character input objects for receiving pressure inputs by the user is relatively small. In this case, as shown in FIG. 8, each of the input objects is reduced in size and the intervals between the input objects are narrowed. If the intervals between the input objects are narrower than a predetermined interval, the control unit 20, based on the input object load standard setting processing according to the present embodiment, sets different load standards to the adjacent input objects at intervals shorter than the predetermined interval.

In the load standard setting processing according to the present embodiment, the input objects with different load standards are arranged alternately, as shown in FIG. 8, for example. In an example shown in FIG. 8, in order to indicate that the adjacent input objects have different load standards, the input objects to which a user needs to input with a stronger pressure are displayed in different colors. That is, it is indicated in FIG. 8 that the load standard (P2) greater than the load standard (P1) at the normal input operation is set for the input objects in a dark color (hatched with broken lines). It is also indicated that the normal load standard (P1) is set for the input objects in a normal (white) color, in contrast.

As a result of setting of the load standards as stated above, the input object, for which the load standard (P2) greater than the normal load standard (P1) is set, is arranged adjacent to the input object, for which the normal load standard (P1) is set, on the input unit 34 of the touch panel 30. That is, the input objects for which the normal load standard (P1) is set and the input objects for which the load standard (P2) greater than the normal load standard (P1) is set are arranged alternately. Hence, it is possible for the user to input to the input objects distinctively even if multiple input objects are closely arranged at adjacent positions.

Figure 6:
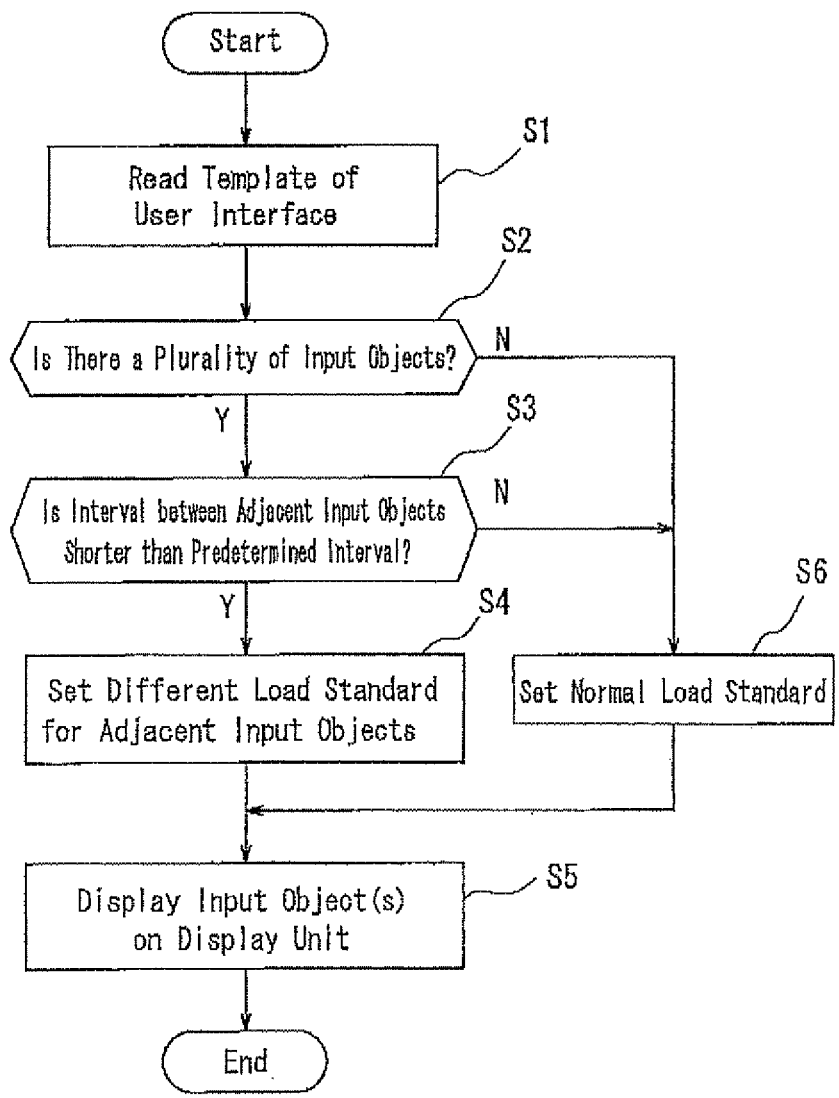
FIG. 6 is a flowchart illustrating input object load standard setting processing according to the present embodiment.
Figure 9:
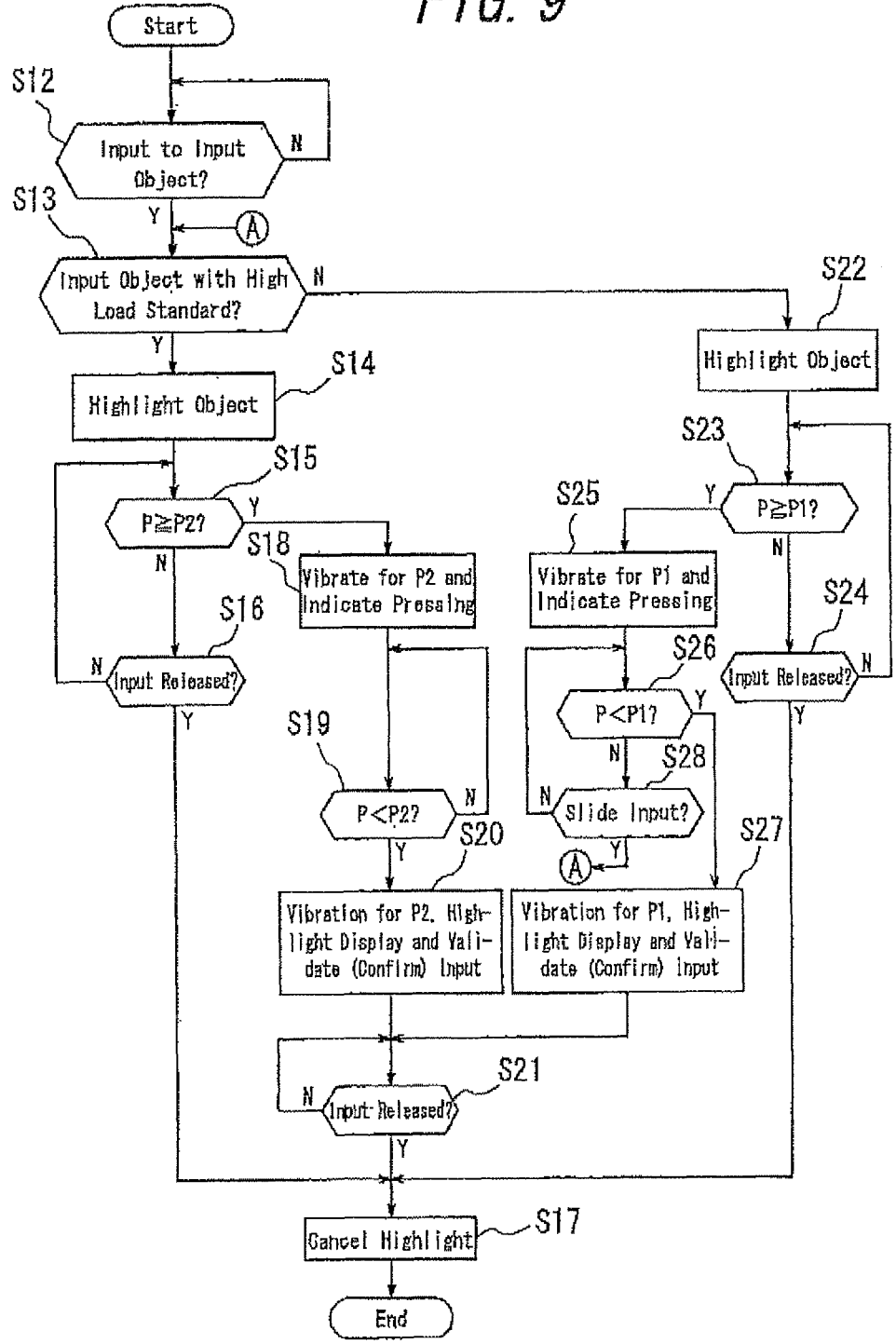
FIG. 9 is a flowchart illustrating pressure input reception processing of an input object according to the present embodiment.

Next, pressure input reception processing of an input object carried out after arranging input objects by the input object load standard setting processing described with reference to FIG. 6 is described with reference to a flowchart shown in FIG. 9. This processing starts at a point of receiving an input to the input unit 34 by the user after activating the user memo writing application or the like and displaying the adjacent input objects on the display unit 32 by the processing described with reference to FIG. 6.

Upon start of the pressure input reception processing of an input object according to the present embodiment, the control unit 20 determines whether an input by the user's finger, the stylus or the like (hereinafter, abbreviated as a "user's input") to the input unit 34 corresponding to an input object on the touch panel 30 is detected (step S12).

If the user's input to the input unit 34 corresponding to the input object is detected at step S12, the control unit 20 determines whether a position on the display unit 32 where the input is detected corresponds to the input object for which the load standard (P2) greater (higher) than the normal load standard (P1) is set (step S13). If the input position corresponds to the input object with the load standard (P2) greater than the normal load standard (P1) (Yes of step S13), the control unit 20 highlights this input object (step S14).

The highlight display at step S14 is an emphasizing display to inform the user that a finger or the like touches the input object. For example, when a user's input to the input object "Delete" key as shown in FIG. 10(A) is detected, the control unit 20 highlights the input object as shown in FIG. 10(B). Thereby, the user can visually recognize that the input by the finger or the like touching the input unit 34 is appropriately detected by the input apparatus. The highlight display indicates simply that the user's finger or the like is touching the input unit 34 and, accordingly, at this point it is not yet determined that the input is received (that is, the key is pressed).

Next, the control unit 20 determines whether the pressure load P detected by the load detection unit 40 exceeds the load standard P2 (step S15). For the input object with the load standard P2, the control unit 20 does not carry out the processing for when an input is received unless there is an input with a pressure load exceeding the load standard P2. Accordingly, if the pressure load P exceeding the load standard P2 is not detected by the load detection unit 40 at step S15, the control unit 20 determines whether the user's input to the input unit 34 is released (step S16).

If it is determined at step S16 that the input is not released (that is the user's finger or the like is not released from the input unit 34), the control unit 20 returns to step S15 to monitor the pressure load P detected by the load detection unit 40. If it is determined at step S16 that the user's input to the input unit 34 is released, it is regarded that there is no input to the input object touched by the user and the control unit 20 cancels the highlight display (step S17) and ends the processing.

Cancellation of the highlight display at step S17 is a display to inform the user that the input by the user's finger or the like to the input unit 34 at a position corresponding to the input object is no longer detected. For example, the control unit 20 changes the highlight display of the input object on the display unit 32 based on a detection of a user's input back to a display state as shown in FIG. 10(A). Thereby, the user can visually recognize that the input apparatus appropriately recognizes that the user's finger or the like, which was touching the input unit 34, is released from the input unit 34.

In contrast, if the pressure load P exceeding the load standard P2 (B1 shown in FIG. 4) is detected by the load detection unit 40 at step S15, the control unit 20 controls the vibration unit 50 to vibrate in order to inform the user that the pressure load P exceeds the load standard P2 (step S18). In this case, the control unit 20 controls the vibration unit 50 to generate vibration in the waveform (longer vibration corresponding to a strong input) as shown in FIG. 5(C). Thereby, the user can recognize that the pressure input P exceeds the load standard P2.

In addition, at step S18, the control unit 20 changes the display of the display unit 32 in order to indicate that the input object to which the input is detected is pressed. That is, the control unit 20 changes the highlight display of the input object as shown in FIG. 10(B) to the display indicating that the input object is pressed as shown in FIG. 10(C). Thereby, the user can visually recognize that the pressure input by the user's finger or the like touching the input unit 34 is appropriately received as a pressure input to the input object by the input apparatus.

After step S18, the control unit 20 determines whether the pressure of the user's input to the input unit 34 is reduced and the pressure load P detected by the load detection unit 40 becomes equal to or lower than the load standard P2 (B2 shown in FIG. 4) (step S19). If it is determined at step S19 that the pressure load P becomes equal to or lower than the load standard P2, the control unit 20 accepts that the operation input to the input object with the load standard P2, currently receiving the input, is confirmed (step S20). That is, in the input processing according to the present embodiment, if compared to a mechanical key, reception of an input to the key is confirmed not when the key is pressed but when the key is released.

At step S20, in addition, the control unit 20 returns the display of the display unit 32 to the highlight display in order to indicate that the pressure load to the input object to which the input is detected becomes equal to or lower than the P2. That is, for example, the control unit 20 returns the display indicating that the input object is pressed as shown in FIG. 10(C) to the highlight display of the input object as shown in FIG. 10(B). Thereby, the user can visually recognize that the pressure input to the input object is confirmed as an input and also that the input apparatus appropriately recognizes that the pressure on the input object is reduced.

At step S20, moreover, the control unit 20 controls the vibration unit 50 to vibrate in order to inform the user that the operation input to the input object with the load standard P2 is confirmed. In this case, the control unit 20 controls the vibration unit 50 to generate the vibration in the waveform (longer vibration corresponding to a strong input) as shown in FIG. 5(D). Thereby, the user can recognize that the operation input to the input object with the load standard P2 is confirmed.

After step S20, the control unit 20 determines whether the user's input to the input unit 34 is released (step S21). If it is determined at step S21 that the input is not released (that is, the user has not released the finger or the like from the input unit 34), the control unit 20 continues to monitor the pressure load P detected by the load detection unit 40. If it is determined at step S21 that the user's input to the input unit 34 is released, the control unit 20 shifts to the above step S17 to cancel the highlight display and ends the processing.

Figure 11:
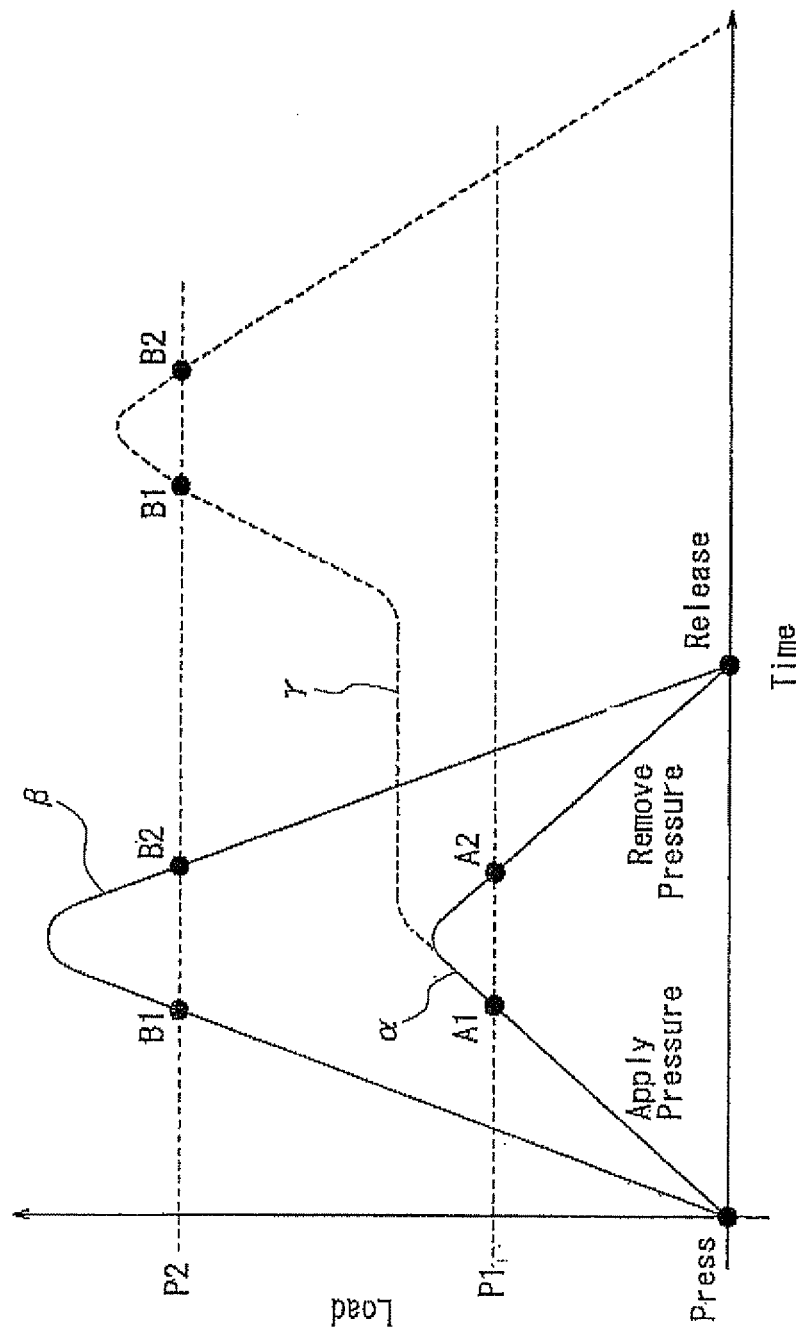
FIG. 11 is a graph schematically illustrating an exemplary chronological change in a load (pressure) detected by the load detection unit in the pressure input reception processing of an input object.

Additionally, a curved line β shown in FIG. 11 represents an exemplary chronological change in the pressure load on the input unit 34 detected by the load detection unit 40 when a series of processing is performed following steps S15, S18, S19 and S20.

On the other hand, if the input position does not correspond to the input object with the load standard P2 at step S13, the control unit 20 shifts to step S22 to highlight the input object. Here, the processing shifts from step S13 to step S22 if the input object to which a user's input is detected is an input object for which the load standard P1 is set. In this case, the input object is highlighted in the same manner as the highlight display at step S14.

Next, the control unit 20 determines whether the pressure load P detected by the load detection unit 40 exceeds the load standard P1 (step S23). For the input object with the load standard P1, the control unit 20, in the same manner as the normal operation input, performs the processing for when the input is received, if there is an input exceeding the load standard P1. Accordingly, if the load pressure P exceeding the load standard P1 is not detected by the load detection unit 40 at step S23, the control unit 20 determines whether the user's input to the input unit 34 is released (step S24).

If it is determined at step S24 that the user's input is not released (that is, the user's finger or the like is not released from the input unit 34), the control unit 20 returns to step S23 to monitor the pressure load P detected by the load detection unit 40. If it is determined at step S24 that the user's input to the input unit 34 is released, the control unit 20 regards that there is no input to the input object touched by the user, cancels the highlight display (step S17) and then ends the processing.

In contrast, if the pressure load P exceeding the load standard P1 (A1 shown in FIG. 4) is detected by the load detection unit 40 at step S23, the control unit 20 controls the vibration unit 50 to vibrate in order to inform the user that the pressure load P exceeds the load standard P1 (step S25). In this case, the control unit 20 controls the vibration unit 50 to generate vibration in the waveform (shorter vibration corresponding to a weak (normal) input) shown in FIG. 5(A). Thereby, the user can recognize that the pressure load P exceeds the load standard P1.

At step S25, in addition, the control unit 20 changes the display of the display unit 32 to indicate that the input object to which the input is detected is pressed. That is, the control unit 20 changes the display from the highlight display as shown in FIG. 10(B) to the display indicating that the input object is pressed as shown in FIG. 10(C). Thereby, the user can visually recognize that the input apparatus appropriately recognizes that the pressure input by the user's finger or the like touching the input unit 34 is received as a pressure input to the input object.

After step S25, the control unit 20 determines whether the pressure of the user's input to the input unit 34 is reduced and the pressure load P detected by the load detection unit 40 becomes equal to or lower than the load standard P1 (A2 shown in FIG. 4) (step S26). If it is determined at step S26 that the pressure load P becomes equal to or lower than the load standard P1, the control unit 20 accepts that the operation input to the input object with the load standard P1 currently receiving the input is confirmed (step S27).

At step S27, additionally, the control unit 20 returns the display of the display unit 32 to the highlight display in order to indicate that the pressure load on the input object to which the input is detected becomes equal to or lower than the P1. That is, for example, the control unit 20 returns the display indicating that the input object is pressed as shown in FIG. 10(C) to the highlight display of the input object as shown in FIG. 10(B). Thereby, the user can visually recognize that the pressure input to the input object is confirmed as an input and also that the input apparatus appropriately recognizes that the pressure on the input object is reduced.

Moreover, at step S27, the control unit 20 controls the vibration unit 50 to vibrate in order to inform the user that the operation input to the input object with the load standard P1 is confirmed. In this case, the control unit 20 controls the vibration unit 50 to generate vibration in the waveform (shorter vibration corresponding to a weak (normal) input) as shown in FIG. 5(B). Thereby, the user can recognize that the operation input to the input object with the load standard P1 is confirmed.

After step S27, the control unit 20 determines whether the user's input to the input unit 34 is released (step S21). If it is determined at step S21 that the input is not released (that is, the user's finger or the like is not released from the input unit 34), the control unit 20 continues to monitor the pressure load P detected by the load detection unit 40. If it is determined at step S21 that the user's input to the input unit 34 is released, the control unit 20 shifts to the above step S17 to cancel the highlight display and ends the processing.

Additionally, a curved line α shown in FIG. 11 represents an exemplary chronological change in the pressure load to the input unit 34 detected by the load detection unit 40 when a series of processing is performed following steps S23, S25, S26 and S27.

In contrast, if the pressure load P does not become equal to or less than the load standard P1 at step S26, the control unit 20 determines whether a so-called slide input by which a position of a pressure input detected by the input unit 34 is moved is detected (step S28). Here, the slide input is an input performed by the user moving a finger or the like while pressing the finger or the like to the input unit 34 such that an input position is moved from an input object originally pressed to another input object.

If it is determined at step S28 that the slide input as described above is not detected by the input unit 34, the control unit 20 returns to step S26 to continue to monitor the pressure load P detected by the load detection unit 40. However, if the slide input with a pressure load exceeding the P1 on the input unit 34 is detected at step S28, the control unit 20 shifts to step S13 to continue the processing. Before shifting from step S28 to step S13, the control unit 20 cancels the press-down display of the input object to which an input is originally detected (before the slide input).

At step S13 after the slide input (step S28), if the input position is moved to an input object with a low load standard (P1) by the slide input, the processing follows steps S22, S23 and S25. That is, since the input is not received (confirmed) at a point when the pressure load P of the input to the input object with the load standard P1 exceeds the load standard P1, the user may change the input object by the slide input. If the input object is changed by the slide input and the pressure load of the pressure input to the input object with the load standard P1 becomes equal to or less than the P1, the control unit 20 confirms the input to the input object with the load standard P1 being pressed at this point.

In contrast, at step S13 after the slide input (step S28), if the input position is moved to an input object with a high load standard (P2) by the slide input, the control unit 20 shifts to step S14 to highlight this input object. Here, if the pressure load of the slide input, performed with the pressure load exceeding the load standard P1, does not exceed the P2, the control unit 20 does not receive the input to the input object with the high load standard (P2), to which the input position is moved, as a pressure input. That is, the user can change an original pressure input (P1<P<P2) detected on the input object with the load standard P1 to an input to an input object with a different pressure load by the slide input to the input object with the load standard P2 with keeping the unconfirmed state of the original pressure input.

Accordingly, after the above processing, the control unit 20 determines at step S15 whether the pressure load P detected by the load detection unit 40 exceeds the load standard P2. If the pressure load P exceeding the load standard P2 is detected by the load detection unit 40 at step S15, the control unit 20 regards that the input object is pressed. In addition, if the pressure load P becomes equal to or lower than the load standard P2 at step S19, the control unit 20 accepts that the operation input to the input object currently receiving the input is confirmed.

As stated above, by the processing to receive the slide input at step S28, it is possible to handle a case that the user, intending to press an input object with the load standard P2, presses an input object with the load standard P1 by mistake. That is, this processing enables to handle a case that the user, intending to press the input object "Delete" (with the load standard P2 (high)), presses the input object "Store" (with the load standard P1 (low)), as shown by an example in FIG. 7. The following is detailed descriptions of processing and operations carried out in this case.

First, if the user, intending to press the input object with the load standard P2, presses the input object with the load standard P1 by mistake (Yes of step S23), the user expects longer vibration corresponding to the load standard P2. However, short vibration corresponding to the load standard P1 is generated actually (step S25). Thereby, the user can recognize that the pressure input to the input object with the load standard P2 is not performed properly but instead the user is touching the input object with the load standard P1. However, at this point, the operation input to the input object (with the load standard P1) being pressed by the user is not confirmed yet (confirmation processing is carried out at step S27).

When recognizing, with the vibration, that the input object with the load standard P1 is being pressed by mistake, the user can slide the finger or the like pressing the input unit 34 to the input object with the load standard P2 originally intended, while maintaining the pressure load exceeding the load standard P1 (step S28). When the slide input is performed from the input object with the load standard P1 to the input object with the load standard P2 originally intended by the user (step S13), the input object with the load standard P2 as a destination is highlighted (step S14). However, the press-down display of the input object is not displayed yet.

Then, when the user inputs with a pressure load exceeding the P2 (step S15), the control unit 20 receives the pressure input to the input object with the load standard P2 originally intended by the user (step S18). This operation by the user is equivalent to an action strongly pressing down the input object after the slide input to the input object originally intended. Then, when the pressure load is reduced by the user or when the finger or the like is released from the input unit 34 (step S19), the control unit 20 confirms the pressure input to the input object with the load standard P2 originally intended by the user (step S20).

A curved line γ shown in FIG. 11 represents an exemplary chronological change in the pressure load to the input unit 34 detected by the load detection unit 40 when a series of processing including before and after the slide input is performed. On the curved line γ, A1 represents a point when the user, intending to press the input object with the load standard P2, presses the input object with the load standard P1 by mistake, and a corresponding operation thereto is step S13 to step S22. A flat portion between the A1 to B1 is a period in which the user, after realizing this incorrect input at A1 by receiving vibration different from expected, performs the slide input (step S28). The B1 represents a point when the user strongly presses down the input object originally intended after the slide input to the input object, and a corresponding operation thereto is step S15 to step S18. Then, the change in the pressure load passes B2 at which the user starts releasing the finger from the input unit 34 while reducing the pressure and a corresponding operation thereto is step S19 to step S20.

As stated above, by the pressure input reception processing of an input object according to the present embodiment, it is possible to handle the case that the user presses the input object with the load standard P1 ("Store" in FIG. 8, for example) by mistake, in spite of an intention to press the input object with the load standard P2 ("Delete" in FIG. 8, for example).

It is to be understood that the present invention is not limited to the embodiments set forth above but may be modified or varied in a multiple manner. For example, although it is assumed in the above embodiments to preset the load standards P1, P2 of the input objects and the predetermined interval, it is desired that the user can change or adjust them as necessary. Thereby, it is possible to appropriately adjust them later if the user feels uncomfortable with them during an operation.

In addition, the vibration unit 50 is vibrated when the pressure load of the user's input exceeds the P1 or the P2 in the above embodiments, in order to inform the user accordingly. However, the vibrations generated by the vibration unit 50 are not limited to those in the waveforms shown in FIG. 5 but may be in any waveforms as long as it is discriminated whether the pressure load by the user exceeds the P1 or the P2. In addition, it is not essential to generate vibration in such a case but it is possible to generate a specific sound from the audio output unit 80. Moreover, it is also possible to indicate that the pressure load of the user's input exceeds the P1 or the P2, by altering the color or a display state of the input object receiving an input on the display unit 32.

Additionally, in the above embodiment, if the input objects are arranged at intervals narrower than the predetermined interval, the load standards set to the input objects are different from one another in order to prevent an incorrect operation by the user. However, if each input object has a wide input reception area, there is a less probability for the user to perform an incorrect input, even if the adjacent input objects are arranged without any interval. Therefore, in such a case, if the input reception area of each of the input objects is larger than a predetermined size, it is not necessary to set different load standards for them. In addition, based on the fact that there is a less probability for the user to perform an incorrect input if the input reception area of each of the input objects is large, it is possible to change the predetermined interval, which is a standard for a determination whether to set different load standards, in accordance with the size of the input reception area of the input object. That is, in a case that the predetermined interval is set to 1 cm, the same load standard may be set if the input reception areas of the input objects are large (that is, if the input objects are large) and also the intervals between the input objects are wider than 0.1 cm, for example, whereas the different load standards may be set if the input reception areas are small and also the intervals are narrower than 2 cm, for example.

Although cases using two load standards P1 and P2 are described as the simplest example in the above embodiments, it is possible to use three or more load standards.

Industrial Applicability

According to the input apparatus of the present invention, the pressure load on the input unit of the touch panel is detected and a load standard for receiving a pressure input to an input object is different from a load standard for receiving a pressure input to another input object adjacent to the input object. Thereby, even if multiple input objects are displayed at adjacent positions on the input unit of a small touch panel, it is possible for the user to distinctly input to each of the input objects.

REFERENCE SIGNS LIST 10 mobile phone
20 control unit
30 touch panel
32 display unit
34 input unit
40 load detection unit
50 vibration unit
60 memory unit
70 audio input unit
80 audio output unit
90 key input unit

The invention claimed is:

1. An input apparatus comprising:
a display unit configured to display an input object;
an input unit configured to detect a pressure input to the input object displayed on the display unit;
a load detection unit configured to detect a pressure load on the input unit; and
a control unit configured to select one of a first load standard and a second load standard each of which is for receiving pressure input to another input object, wherein the second load standard is higher than the first load standard and is selected when the another input object is adjacent to the input object, in response to determining a distance from an end of the input object and an end of the another input object is narrower than a predetermined interval.

2. The input apparatus according to claim 1, further comprising a vibration unit configured to vibrate the input unit, wherein
the control unit controls to drive the vibration unit if the pressure load detected by the load detection unit satisfies one of the first and second load standards.

3. The input apparatus according to claim 2, wherein the control unit controls to drive again the vibration unit if, after the pressure load detected by the load detection unit satisfies one of the first and second load standards, the pressure load detected by the load detection unit does not satisfy one of the first and second load standards.

4. The input apparatus according to claim 1 wherein the control unit controls to confirm the pressure input to the input object being detected by the input unit when, after the pressure load detected by the load detection unit satisfies one of the first and second load standards, the pressure load detected by the load detection unit does not satisfy one of the first and second load standards.

5. The input apparatus according to claim 2, wherein the control unit controls to confirm the pressure input to the input object being detected by the input unit when, after the pressure load detected by the load detection unit satisfies one of the first and second load standards, the pressure load detected by the load detection unit does not satisfy one of the first and second load standards.

6. The input apparatus according to claim 3, wherein the control unit controls to confirm the pressure input to the input object being detected by the input unit when, after the pressure load detected by the load detection unit satisfies one of the first and second load standards, the pressure load detected by the load detection unit does not satisfy one of the first and second load standards.

7. An input apparatus comprising:
a display unit configured to display an input object;
an input unit configured to detect a pressure input to the input object displayed on the display unit;
a load detection unit configured to detect a pressure load on the input unit; and
a control unit configured to select one of a first load standard and a second load standard each of which is for receiving pressure input to another input object, wherein the second load standard is higher than the first load standard and is selected when the another input object is adjacent to the input object, in response to determining a distance from a center of the input object and a center of the another input object is narrower than a predetermined interval, and
wherein the control unit is further configured to provide an indication that the another input object with the higher load standard requires a pressure heavier than that of the normal load standard for the input object, wherein the control unit provides the indication by modifying a display feature of the another input object such that the another input object and the input object are displayed in a different manner.

8. The input apparatus according to claim 2, wherein the control unit is further configured to control the vibration unit to:
vibrate with a first vibration when the pressure input to the input object satisfies the normal load standard, and
vibrate with a second vibration when the pressure input to the another input objection satisfies the higher load standard, wherein the first vibration and the second vibration are different.

* * * * *